United States Patent [19]
Franke et al.

[11] 4,266,134
[45] May 5, 1981

[54] X-RAY DIAGNOSTIC GENERATOR COMPRISING AN INVERTER SUPPLYING THE HIGH VOLTAGE TRANSFORMER

[75] Inventors: Kurt Franke, Erlangen; Gerd Seifert, Spardorf, both of Fed. Rep. of Germany

[73] Assignee: Siemens Aktiengesellschaft, Berlin & Munich, Fed. Rep. of Germany

[21] Appl. No.: 969,223

[22] Filed: Dec. 13, 1978

[30] Foreign Application Priority Data

Jan. 20, 1978 [DE] Fed. Rep. of Germany ....... 2802513

[51] Int. Cl.³ .............................................. H05G 1/10
[52] U.S. Cl. ..................................... 250/409; 250/421
[58] Field of Search ............... 250/401, 402, 408, 409, 250/413, 421

[56] References Cited
U.S. PATENT DOCUMENTS
3,320,477  5/1967  Boeber .................................. 250/421

*Primary Examiner*—Craig E. Church
*Attorney, Agent, or Firm*—Hill, Van Santen, Steadman, Chiara & Simpson

[57] ABSTRACT

The inverter utilizes an LC oscillatory circuit and a switching device for the alternate connection of this oscillating circuit to a d.c. voltage source. Adjustment circuitry is present for the adjustment of the capacitance and/or inductance of the LC oscillatory circuit. Through this circuitry, the inverter is adaptable to different load conditions.

4 Claims, 2 Drawing Figures

X-RAY DIAGNOSTIC GENERATOR COMPRISING AN INVERTER SUPPLYING THE HIGH VOLTAGE TRANSFORMER

BACKGROUND OF THE INVENTION

The invention relates to an x-ray diagnostic generator comprising an x-ray tube, a high voltage transformer feeding the x-ray tube, an inverter connected to the input of the high voltage transformer, and a mains rectifier supplying the inverter.

In the case of an x-ray diagnostic generator of this type, it is possible to select the supply frequency of the transformer in the kHz range; i.e., substantially higher than the mains frequency. On account of this high supply frequency, the high voltage transformer can be provided with a substantially smaller and more lightweight construction than in the case of an x-ray diagnostic generator which is operated with the mains frequency. In an x-ray diagnostic generator of this type, the loading of the inverter is not constant; on the contrary, it corresponds to the adjusted x-ray tube voltage and the adjusted x-ray tube current. Thus, the inverter is variably highly loaded in dependence upon these values.

SUMMARY OF THE INVENTION

The object underlying the invention consists in constructing an x-ray diagnostic generator of the type initially cited such that the inverter is capable of adaptation to different load conditions.

This object is achieved in accordance with the invention by virtue of the fact that the inverter manifests an LC oscillatory circuit and a switching apparatus for the alternate connection of this oscillatory circuit to a d.c. voltage source, and that adjustment means are present for the adjustment of the capacitance and/or inductance of the LC oscillatory circuit. In the inventive inverter, the output voltage is tapped at a component of the oscillatory circuit. The oscillatory circuit is here adaptable to the load by means of adjusting its capacitance and/or inductance such that the oscillatory circuit can always be optimally adapted to the load current.

It is particularly expedient if the LC oscillatory circuit manifests the series connection of a capacitor with the primary winding of the high voltage transformer. In this instance, the outlay for components in the inverter is reduced to a minimum. In addition, the switches which effect the changeover switching of the oscillatory circuit are protected against short-circuits in the load current circuit, because they are connected in series with the capacitor of the oscillatory circuit.

The invention shall be explained in greater detail in the following on the basis of two sample embodiments; and other objects, features and advantages will be apparent from this detailed disclosure and from the appended claims.

DETAILED DESCRIPTION

Figure 1:
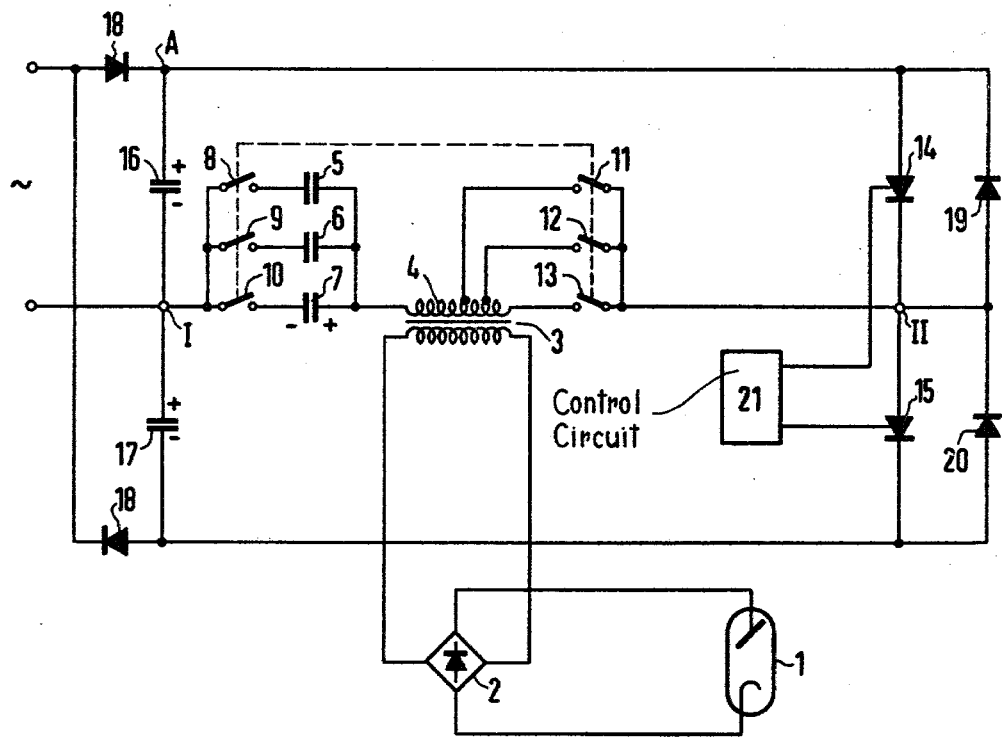
FIG. 1 shows an electric circuit diagram of an illustrative embodiment in accordance with the invention.

In FIG. 1, an x-ray tube 1 is illustrated which is fed via a high voltage rectifier 2 by a high voltage transformer 3. The primary winding 4 of the high voltage transformer 3 is connected in series with a capacitance which is adjustable by means of selective parallel-connection of three capacitors 5, 6, 7, via switches 8, 9, 10. The x-ray tube voltage is adjustable by means of switches 11, 12, 13, which are connected to taps of the primary winding 4 of the high voltage transformer 3.

The oscillatory circuit consisting of the leakage inductance of the high voltage transformer 3 and the capacitors 5, 6, 7 can be alternately connected, via two thyristors 14, 15 to two capacitors 16, 17 which are charged from the mains with the illustrated polarities via a mains rectifier 18. Free-running or bypass diodes 19, 20, are connected in anti-parallel fashion with the thyristors 14 and 15.

If, for example, thyristor 14 is first rendered conductive, by means of an ignition pulse from a control device 21, and switch 10 is closed, capacitor 7 is charged with the illustrated polarity; namely, to a voltage which, due to the oscillatory circuit consisting of capacitor 7 and the leakage inductance of the high voltage transformer 3, lies above the voltage of capacitor 16. Upon termination of the charging operation, thyristor 14 is extinguished. Subsequently, capacitor supplies charge via the free-running or bypass diode 19 to capacitor 16. During the charging operation, there is connected to the primary winding 4 of the high voltage transformer 3 one half wave of an a.c. voltage. The other, oppositely polarized half wave is connected if thyristor 15 is subsequently ignited by control device 21. The described operations are repeated in conjunction with capacitor 17 and bypass diode 20 with the opposite polarity. Thus, due to the alternate ignition of thyristors 14 and 15, an a.c. voltage is connected to the primary winding 4 of the high voltage transformer 3.

The oscillatory circuit which, in the example wherein switch 10 is closed, consists of capacitor 7 and the leakage inductance of the high voltage transformer 3, is expediently adapted to the load; i.e., to the selected x-ray tube current and to the selected x-ray tube voltage. To this end, it is possible to selectively connect, in parallel with capacitor 7, via switches 8 and 9, one or more of the capacitors 5 and 6 or to replace capacitor 7 with capacitor 5 or 6 or with the parallel connection of these two capacitors. To this end, switches 8, 9, 10, can be correspondingly activated.

Figure 2:
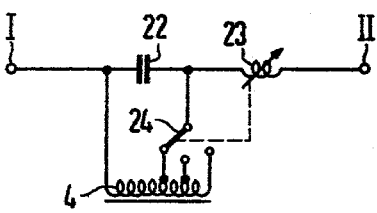
FIG. 2 is an electric circuit diagram showing a modification of the circuit of FIG. 1.

In the sample embodiment according to FIG. 2, there is connected in place of the circuit elements between points I and II in FIG. 1, the series connection consisting of a capacitor 22 and an adjustable inductance 23. The voltage for the primary winding 4 of the high voltage transformer 3 is here tapped at capacitor 22. In this instance, the oscillatory circuit inductance is not formed, as in the case of the example according to FIG. 1, by the leakage inductance of the high voltage transformer, but, on the contrary, by the adjustable inductance 23. The adaptation of the oscillatory current in the oscillatory circuit 22, 23, which must lie a predetermined amount above the load current; namely, must amount to approximately triple the load current, can proceed by means of adjusting inductance 23.

The adaptation of the oscillatory circuit to the load has as its consequence the fact that the losses in the switching elements of the inverter always have their minimum value.

The oscillatory circuit frequency becomes smaller if the capacitance of the oscillatory circuit according to FIG. 1 is enlarged for the purpose of adaptation to the load. This occurs in the case of an increase in the load; i.e., if the resistance of x-ray tube 1, which resistance, transformed onto the primary side of the high voltage transformer 4, is reduced to a lower resistive (or ohmic) value. In the other instance, i.e., in the case of reduction of the inductance according to FIG. 2 for the purpose of adaptation to a reduction to a lower resistive (or ohmic) value of transformed x-ray tube resistance, the oscillatory circuit frequency likewise becomes smaller. However, it is desirable for the oscillatory circuit frequency to have a constant optimum value, since too low an oscillatory circuit frequency would, under certain conditions, allow the ripple component of the high voltage to increase impermissibly and would subject the high voltage transformer to an interval of impermissibly high voltage, whereas an excessively high oscillatory circuit frequency would, under certain circumstances, load the thyristors with excessively high (di/dt) values. Accordingly, within the framework of the invention, it is expedient, for the purpose of adaptation to the load, to vary the oscillatory circuit capacitance as well as the oscillatory circuit inductance oppositely relative to one another such that the oscillatory circuit frequency remains constant and has an optimum value at which neither the thyristors are too strongly loaded nor the ripple component of the high voltage and the high voltage interval of the high voltage transformer are too great. To this end, it is possible to construct capacitor 22 in FIG. 2 in the form of an adjustable capacitor. In this example, the oscillatory current should always be approximately three times as great as the respective load current, as has been previously described.

It is particularly expedient, in the example according to FIG. 1, to couple switches 8, 9, 10, for the adjustment of the oscillatory circuit capacitance with switches 11, 12, 13, for the adjustment of the x-ray tube voltage; i.e., to effect both adjustments by means of a single adjustment element, as is indicated by the broken line. Also, in the example according to FIG. 2, according to the broken line, the adjustment means for the inductance 23 can be coupled with the adjustment means 24 for the x-ray tube voltage. In case the capacitance of capacitor 22 is variable, the adjustment means provided for this purpose can also be coupled with the adjustment means for the x-ray tube voltage.

It will be apparent that many modifications and variations may be effected without departing from the scope of the novel concepts and teachings of the present invention.

I claim as my invention:

1. An x-ray diagnostic generator comprising
an x-ray tube,
a high voltage transformer supplying the x-ray tube,
an inverter connected to the input of the high voltage transformer, and
a d.c. voltage source comprising a mains rectifier supplying the inverter,
the inverter (4 through 24) having an LC resonant storage circuit (3 through 7, 22, 23) and a switching device (14, 15) for the alternate connection of said storage circuit (3 through 7, 22, 23) to the d.c. voltage source (16, 17),
said LC resonant storage circuit comprising switchable electrical reactance means switchable to a plurality of respective different values to provide respective different pre-programmed LC series circuits for selective connection to said high voltage transformer and respectively adapted to operation with said high voltage transformer operating under respective different load conditions, and
changeover switch means coupled with said switchable electrical reactance means for selectively establishing any selected one of said different preprogrammed LC series circuits in operative connection with said high voltage transformer, thereby to adapt the parameters of said LC resonant storage circuit to any of a plurality of respective load conditions of said high voltage transformer.

2. An x-ray diagnostic generator according to claim 1, with said switchable electrical reactance means comprising respective separate reactance elements (5, 6, 7) and said changeover switch means comprising respective selectively operable switches (8, 9, 10) for selectively connecting respective different ones of said separate reactance elements (5, 6, 7) in circuit with said high voltage transformer (4).

3. An x-ray diagnostic generator according to claim 2, with said respective separate reactance elements comprising respective individual capacitors (5, 6, 7) in series with the respective selectively operable switches (8, 9, 10), said high voltage transformer (3) having a primary winding (4) selectively connectable in series with each of said capacitors (5, 6, 7) upon closure of the respective associated switch (8, 9, 10) in series with such capacitor.

4. An x-ray diagnostic generator according to claim 1, with said high voltage transformer (3) having adjustment means (11, 12, 13; 24) for changing the transformer primary-secondary turns ratio of said high voltage transformer and to simultaneously actuate said changeover switch means to connect respective different ones of said preprogrammed LC series circuits with said high voltage transformer to increase the current from the LC resonant storage circuit as the load current is increased without a substantial change in the operating frequency of the storage circuit.

* * * * *